United States Patent

[11] 3,603,662

| [72] | Inventors | Ralph F. Wuerker<br>Palos Verdes Estates;<br>Lee O. Heflinger, Torrance, both of, Calif. |
|---|---|---|
| [21] | Appl. No. | 888,459 |
| [22] | Filed | Dec. 29, 1969 |
| [45] | Patented | Sept. 7, 1971 |
| [73] | Assignee | TRW Inc.<br>Redondo Beach, Calif. |

[54] TWO-BEAM, WIDE-VIEWING ANGLE HOLOGRAPHIC APPARATUS
4 Claims, 2 Drawing Figs.

| [52] | U.S. Cl. | 350/3.5, 350/299 |
|---|---|---|
| [51] | Int. Cl. | G02b 27/00 |
| [50] | Field of Search | 350/3.5, 299, 300 |

[56] References Cited
UNITED STATES PATENTS
3,529,883   9/1970   Wuerker et al. ............... 350/3.5

OTHER REFERENCES
Brooks et al., IEEE Jour. of Quantum Electronics, Vol. QE-2, Aug. 1966. pp. 275– 279 (copy in 350/3.5)

*Primary Examiner*—David Schonberg
*Assistant Examiner*—Ronald J. Stern
*Attorneys*—Daniel T. Anderson, Edwin A. Oser and Jerry A. Dinardo ABSTRACT: Holographic apparatus for taking holograms in transmission with lasers of limited coherence permitting a wide-viewing angle on the order 50° to 60°. The apparatus features an angle between the reference and scene beams, at the hologram, on the order of 90°. Once the laser beam is enlarged and collimated there is no need for any additional lenses in the path of the reference beam. The scene beam includes a diffuser and a lens system between the light diffuser and the object being holographed. The lens collects light diffused by the light diffuser, focusing it through the object onto the hologram and provides the wide three-dimensional viewing angle for reproduction. Also a beam bender is included into the path of the scene beam for bending the light through an angle of 90° and deliberately introducing path length differences across the cross section of the scene beam.

This invention herein described was made in the course of or under a contract or subcontract thereunder, with the Department of the Air Force.

Ralph F. Wuerker
Lee O. Heflinger
INVENTORS

Ralph F Wuerker
Lee O. Heflinger
INVENTORS

TWO-BEAM, WIDE-VIEWING ANGLE HOLOGRAPHIC APPARATUS

CROSS-REFERENCE TO RELATED APPLICATION

The present application may be considered to be an improvement over a prior copending application, Ser. No. 774,019, filed Nov. 7, 1968, by the present applicants and assigned to the assignee of the present application, now U.S. Pat. No. 3,529,883.

BACKGROUND OF THE INVENTION

This invention relates generally to holography and particularly relates to a holographic apparatus for taking holograms and double-exposed holographic interferograms in transmission of an object, with relatively large viewing angle on the order of 50° to 60°.

In the recent past the need arose for holographic apparatus permitting the recording of holograms of relatively large objects. This, of course, requires a large scene or object volume. Accordingly it is desirable to direct the reference beam in such a manner that it does not pass through the scene volume. For obvious geometrical reasons, this requires that the reference beam and the scene beam make a relatively large angle with each other at the hologram, that is, an angle which should be no less than 60° and preferably 75° to 90° or more.

However, if the scene and reference beam intersect each other at the plane of the hologram at such a large angle, the recording medium, such, for example, as a photographic plate, must have very high resolution. It can easily be shown that if reference and scene beam intersect at an angle of 60° the resolution required for the holographic fringe spacing must be on the order of a wavelength. If this angle is increased to 90° the resolution of the plate must be increased to resolve fringes on the order of 0.707 times the wavelength.

It is well known that photographic plates with such high resolution have very low light sensitivity. Therefore the use of a photographic plate with high resolution requires a very high intensity light source for taking holograms. About the only practical light source available at this time with sufficiently high light intensity is a pulsed ruby laser. A pulsed ruby laser also permits to take holograms of action scenes. In this connection it should also be noted that the holographic apparatus must be maintained stationary or vibration-free within the order of a tenth of a wavelength of light while the hologram is taken. This generally requires a very short pulse exposure, that is, light pulses of a duration as short as a few nanoseconds. Again the only practical light source which is sufficiently coherent for obtaining holograms is a pulsed ruby laser.

However, the drawback of a pulsed ruby laser is that it is much less coherent than other laser sources, such, for example, a gas laser. This, in turn, makes it necessary to construct a holographic apparatus providing careful temporal and spatial coherence matching of the reference and scene beams.

It is accordingly an object of the present invention to provide an improved holographic apparatus for recording transmission holograms with careful temporal and spatial coherence matching in such a way that there is complete interference between the reference and the scene beams at the plane of the hologram.

Another object of the present invention is to provide holographic apparatus of the type referred to which provides a relatively large viewing angle on the order of 60° of the object recorded.

Another object is to provide a holographic apparatus in which the scene-reference beam angles are so great that there is no eclipsing of reference beam by objects in the scene.

Still another object of the present invention is to provide a holographic apparatus where reference and scene beams substantially pass through each other between the scene volume and the hologram and which provides both temporal and spatial coherence matching whereby a ruby laser with relatively poor coherence may be utilized.

SUMMARY OF THE INVENTION

The holographic apparatus in accordance with the present invention is particularly adapted for recording holograms in transmission of a relatively large object. It also provides a wide viewing angle and features both temporal and spatial coherence matching. The holographic apparatus includes a laser for developing a coherent, substantially monochromatic first light beam. This light beam is preferably expanded and collimated. This, in turn, makes it unnecessary to provide any additional lenses in the path of the reference beam.

The first light beam is now split by first optical means, including a beam splitter, into a reference and a scene beam. A photosensitive material, such for example, as a photographic plate, a photochromic material or the like, is disposed in a predetermined plane for recording a hologram.

Second optical means is provided for directing the reference beam toward the photosensitive material. Third optical means is provided for directing the scene beam in a direction substantially parallel to the direction of the major portion of the reference beam, the reference and scene beam jointly defining a plane. Initially, the scene beam is directed perpendicularly out of this plane and is then redirected into the plane. A beam bender is included in the third optical means for bending the scene beam and introducing appropriate changes in the path length to compensate for path differences which occur at the hologram due to the angle between the scene and reference beams.

A light diffuser preferably is interposed into the path of the scene beam ahead of the object to be recorded. Finally condensing lens means is interposed between the light diffuser and the object. The condensing lens collects the light scattered by the light diffuser and directs it through the object and focuses it on the photosensitive material.

Preferably the angle between the scene beam and the reference beam where they intersect the photosensitive material is no less than 60° and may be between approximately 75° and approximately 90°.

In general, reference is made to the previously referred to copending application which teach the relations which are necessary to accomplish both transverse and temporal matching of reference and subject beams.

BRIEF DESCRIPTION OF THE DRAWINGS

The novel features that are considered characteristic of this invention are set forth with particularity in the appended claims. The invention itself, however, both as to its organization and method of operation, as well as additional objects and advantages thereof, will best be understood from the following description when read in connection with the accompanying drawings wherein:

DESCRIPTION OF THE PREFERRED EMBODIMENTS

Figure 1:
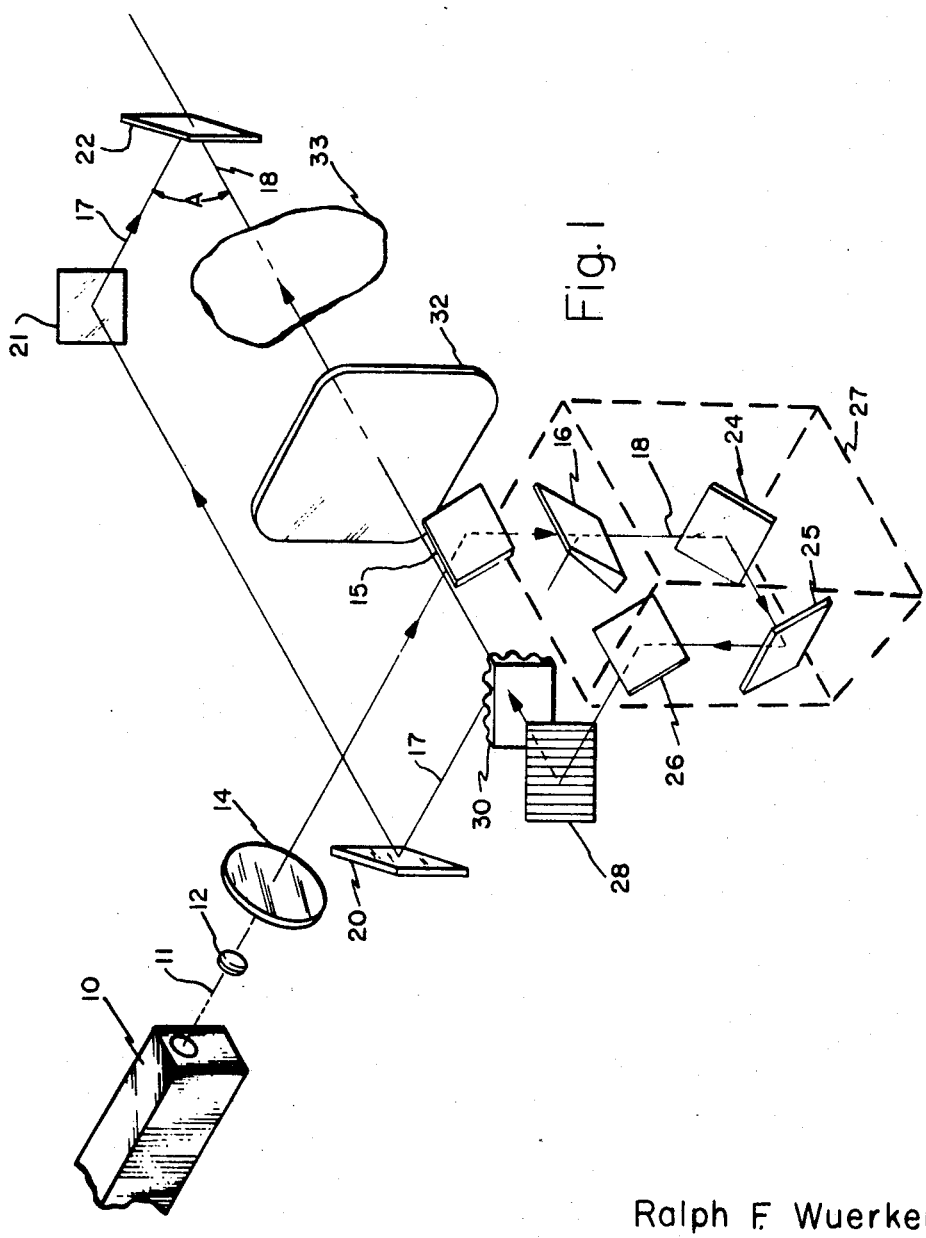
FIG. 1 is an isometric, schematic view of a holographic apparatus embodying the present invention.

Referring now to FIG. 1, there is illustrated an isometric schematic view of a holographic apparatus in accordance with the present invention. The apparatus includes a laser 10 which may be enclosed in a suitable housing. By way of example, the laser 10 may be a pulsed ruby laser of the type which develops a short output pulse of high light intensity, but with relatively poor coherence. The laser 10 may consist of a ruby oscillator followed by a ruby amplifier but does not necessarily require a mode selector. Accordingly a laser beam 11 issues from the laser 10. This laser beam 11 may be enlarged and collimated for example, by a negative lens 12, followed by a positive lens 14, which jointly form a Galilean telescope, that is, a beam-enlarging and collimating lens system. The laser beam issuing from the lens system 12, 14 preferably is of a sufficient size so that no further lenses are required in the path of the reference beam.

The laser beam may now be deflected downwardly by a light reflector 15 which may, for example, consist of a suitable front surface mirror, that is, a mirror having a reflecting surface at the front facing the laser beam; instead of a front surface mirror, a suitable prism may be used. However a rear surface mirror is not suitable because a portion of the light beam would be reflected from the front glass surface to form a second undesired laser beam.

Accordingly the light beam is now directed downwardly onto a beam splitter 16. This beam splitter 16 may, for example, consist as shown of a glass wedge, the front surface of which reflects a portion of the light to provide a reference beam 17, while the major portion of the light passes through the wedge 16 to provide a scene beam 18. In general, about 10 percent of the light intensity may be reflected to form the reference beam 17. The reference beam 17 is subsequently reflected by a pair of reflectors 20 and 21 which may be identical to the reflector 15. The reference beam 17 is then made to impinge on the plane of a photosensitive material 22 which serves the purpose of recording the hologram. This photosensitive material may, for example, consist of a suitable photographic emulsion, or alternatively of a photochromic material.

It should be noted that the reference beam is solely directed by two light reflectors 20 and 21 and that there is no need to provide a lens in the path of the reference beam.

The scene beam 18 is now reflected by a set of three light reflectors 24, 25 and 26. It will be noted from FIG. 1 that the scene beam is reflected downwardly and out of the plane formed by the reference beam 17. The three mirrors 24, 25 and 26 and the beam splitter 16 are enclosed by dotted lines 27 to indicate schematically that they may be contained in a separate mirror box, as will be more fully explained in connection with FIG. 2.

The scene beam reflected from the light reflector 26 now passes through a beam bender 28. The beam bender 28 is constructed in such a manner that it bends the scene beam through a predetermined angle, such as 90°, as shown in FIG. 1 and deliberately changes the path length of individual rays of the scene beam, thereby to provide temporal matching. If a mirror were used instead of the beam bender 28, the path lengths of corresponding scene and reference rays would be found to be unequal at the outer sides of the hologram. The absence of temporal matching would require the use of a laser with far greater coherence and hence greater cost and complexity. This may, for example, be effected by a two-stage prism plate. Preferably however, the beam bender is used herein which is disclosed and claimed in the prior copending application of the applicants, Ser. No. 855,867, filed on Sept. 8, 1969, entitled "Optical Element for Bending a Light Beam," now abandoned and assigned to the assignee of the present invention. Such a beam bender will vastly improve the temporal matching of the reference and scene beams. This is particularly important in a holographic apparatus of the type disclosed here, where the angle between the reference and scene beam as they intersect the hologram 22 is large.

The beam bender 28 may be followed by a light diffuser 30 shown separately in the path of the scene beam. Preferably however, the beam bender 28 and the light diffuser 30 are combined into a single unit or else the light diffuser may be in optical or physical contact with the rear surface of the beam bender 28. It should also be noted that the positive lens 14 need not be disposed adjacent the negative lens 12 but could, for example be disposed between the mirror 15 and beam splitter 16.

A condenser lens system shown schematically at 32 may be interposed between the light diffuser 30 and the hologram 22 and ahead of an object schematically shown at 33 which is to be recorded. The lens system 32 may act as a condenser lens to collect the light scattered by the light diffuser 30 and focus it through the object 33 onto the hologram 22. Actually the lens system 32 may be a quadruple lens set of large diameter so as to illuminate a large scene volume schematically shown by the object 33. The condenser lens system 32 preferably should be designed to minimize spherical aberration but a high quality imaging lens is not required.

The angle A between the reference beam 17 and the scene beam 18 as shown in FIG. 1 is on the order of 90°. This is, of course, the angle between the two beams as they intersect at the plane of the hologram 22. This angle A should be no less than 60° and preferably is between approximately 75° and approximately 90°. However, it should be realized that this angle may be even larger than 90°.

As pointed out before, the interference fringe spacing for an angle A of 60° is equal to the wavelength. For an angle of 90° as shown in FIG. 1, the fringe spacing equals 0.707 times the wavelength. Accordingly a high resolution plate is required which is generally not very light sensitive. Such plates are available from Eastman Kodak under the designation 649F and from Agfa under the designation 8E75 and 10E75. Excellent holograms in transmission have been obtained with such plates with the holographic apparatus shown in FIG. 1.

One of the reasons for having a large angle A between reference and scene beams is to make sure that the reference beam does not interfere with the object or the scene volume.

The holographic apparatus of FIG. 1 has temporal coherence match between the reference and scene beams. This is effected quite simply by equalizing the path length of the reference and scene beams between the beam splitter 16 and the hologram 22. The temporal coherence match is obtained over the entire hologram by the beam bender 28 which bends the scene beam through an angle on the order of 90° producing appropriate change in the path lengths so as to compensate for the path differences introduced by the scene-reference beam angle at the hologram.

The spatial match is obtained, even in the presence of the diffuser, by the use of the condenser lens 32 which focuses the diffuser 30 onto the hologram 22. It is not necessary, for example, that the left side of the laser beam be coherent with the right side. The reason is that the interference which occurs at the hologram arises only because of the interference of each portion of the laser beam with itself.

It should be noted that the holographic apparatus of FIG. 1 is characterized by great simplicity and by the absence of any lenses in the path of the reference beam. There is no interference between the reference beam and the object or scene volume. The scene volume may be as large as 12×12×12 inches. Furthermore, the viewing angle of the hologram can be made very large on the order of 50° to 60°. This is, of course, a function of the condenser lens system 32. It should also be noted that the hologram is made of an object 33 in transmission.

An additional advantage of a collimated or parallel reference beam is that the beam may readily be reversed. This may be important where it is desired to reconstruct a real image of the object when viewing a hologram.

Figure 2:
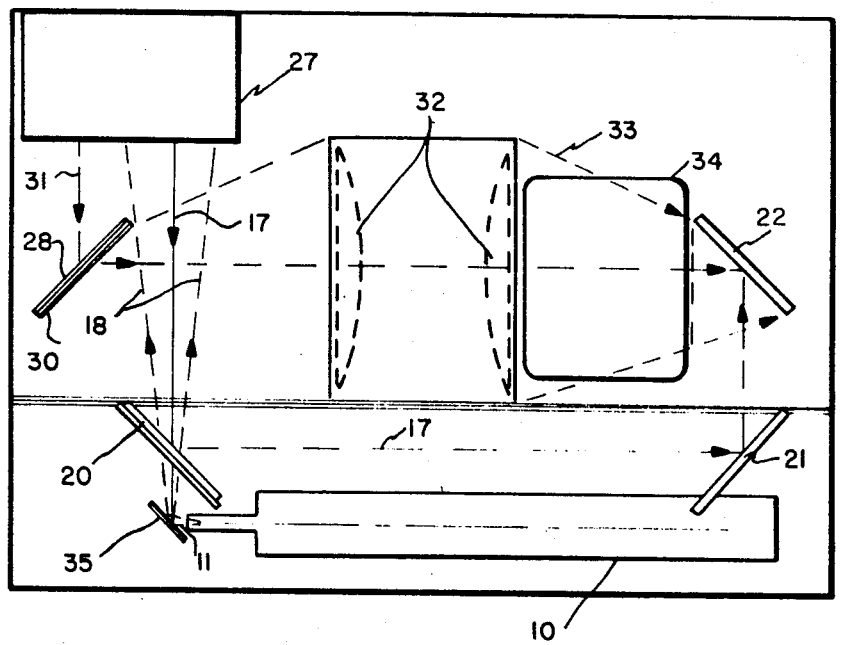
FIG. 2 is a side elevational view of an assembly drawing of a modified holographic apparatus in accordance with the present invention.

Referring now to FIG. 2, there is illustrated a schematic top elevational view of a modified assembly of the holographic apparatus of the invention. Again the laser is shown enclosed in a box 10 which may now include the lens 12 for enlarging the beam. The laser beam 11 is reflected by the reflector 35 and passes below the reflector 20. The laser 10 and the mirror 35 are in a plane below the primary plane of the holographic apparatus which is defined by the beam splitter 16. The enlarged scene beam 18 passes into the mirror box 27 which may include the reflectors 15, 24, 25 and 26 and also the positive lens 14 for collimating the beam, and beam splitter 16. The beam issues from the mirror box 27 as shown at 31 and is passed through the beam bender 28 followed by a light diffuser 30 to be focused onto the hologram 22 via the lens 32. The reference beam 17 issues from the mirror box 27 and thence to mirrors 20 and 21 and then to hologram 22. The lens system 32 as shown is composed of two lenses but may actually consist of a quadruple lens set. This, in turn, produces a large scene volume shown by the dotted lines 33. The box 34 may be used for housing the object to be recorded.

Otherwise the operation of the holographic apparatus of FIG. 2 is the same as that of FIG. 1. Again it will be noted that the angle between the reference and the scene beam is 90°. The lens system 32 affords a wide viewing angle on the order of 50° to 60°. Also the plane of hologram 22 is so arranged that it is perpendicular to the bisector of the reference and scene beams.

It should be noted that the hologram may easily be reconstructed or viewed by blocking off the subject beam and illuminating a previously recorded hologram by the reference beam 17. A virtual image of the object appears where the original object was located.

There has thus been disclosed an improved holographic apparatus which permits to take transmission holograms of large objects. The arrangement is such that the object or volume cannot block the reference beam. Also a lens system may be provided which uses a relatively large included viewing angle on the order of 50° to 60°. A pulsed ruby laser may be used as the light source which develops sufficient light intensity so that even a short duration pulse has enough intensity to illuminate high resolution plates. The arrangement of the holocamera is such that the scene beam and the reference beam intersect each other substantially at right angles at the hologram. Both temporal and spatial coherence matching may be obtained so that the resolution of the hologram is uniform across the entire large field of view.

What is claimed is:

1. A holographic apparatus for recording holograms in transmission of a relatively large object and providing a wide-viewing angle as well as both temporal and spatial coherence matching, said apparatus comprising:
   a. a solid-state laser for developing a coherent, substantially monochromatic and collimated first light beam having a relatively limited coherence length, said collimated first light beam extending along a first path;
   b. a first mirror oriented to redirect said first beam along a second path substantially perpendicular with respect to said first path;
   c. a beam splitter disposed in the path of said redirected first beam and oriented to reflect a portion of said first beam along a third path to provide a reference beam, said beam splitter transmitting the remaining major portion of said first beam along said second path to provide a scene beam;
   d. a second, third and fourth mirror for redirecting said scene beam, first in a direction perpendicular to both said first path and said second path, second in a direction parallel to said second path, and third in a direction parallel to said first path;
   e. a beam bender for redirecting said scene beam along a path defining a main axis and perpendicular to both said first and said second path, and toward a photosensitive material on which the hologram is to be recorded, said beam bender maintaining the path lengths of the individual rays of said scene beam substantially constant throughout its cross section;
   f. a light diffuser interposed in the path of said scene beam along said main axis and ahead of the object to be recorded;
   g. a fifth and a sixth mirror for further redirecting said reference beam, first into a direction parallel to said main axis, and then toward the plane of the photosensitive material;
   h. a planar photosensitive material disposed in said plane for recording the hologram; and
   i. condensing lens means interposed between said light diffuser and the object for collecting the light scattered by said light diffuser and directing and focusing it through the object onto said photosensitive material, said beam bender, said fourth mirror, and said fifth and said sixth mirror being so arranged that the angle between said scene beam and said reference beam, where they intersect at said photosensitive material, is between approximately 60° and approximately 90°.

2. A holographic apparatus as defined in claim 1 wherein said beam bender and said fourth, said fifth, and said sixth mirror are each arranged to redirect the respective scene and reference beams at an angle of substantially 90° so that the angle between said scene beam and said reference beam, where they intersect at said photosensitive material, is substantially 90°.

3. A holographic apparatus as defined in claim 1 wherein said photosensitive material is disposed in a plane substantially normal to a line bisecting the angle between said reference and scene beams where they intersect at said photosensitive material.

4. A holographic apparatus as defined in claim 1 wherein a beam-enlarging and collimating lens system is interposed between said laser and said first mirror for expanding and collimating said first light beam.